United States Patent
Fox

(10) Patent No.: US 6,879,663 B2
(45) Date of Patent: Apr. 12, 2005

(54) METHOD AND STRUCTURE FOR DIAGNOSING PROBLEMS ON A DSL DEVICE

(75) Inventor: Thomas J. Fox, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 112 days.

(21) Appl. No.: 10/461,721

(22) Filed: Jun. 13, 2003

(65) Prior Publication Data
US 2004/0258221 A1 Dec. 23, 2004

(51) Int. Cl.[7] .......................... H04M 1/24; H04M 3/08; H04M 3/22
(52) U.S. Cl. .................. 379/1.03; 379/1.04; 379/15.03; 379/22.04; 379/29.08
(58) Field of Search ................................ 379/1.01, 1.03, 379/1.04, 14.01, 15.03, 15.05, 22.01, 22.02, 22.03, 22.04, 27.01–27.03, 28, 29.08, 32.04

(56) References Cited

U.S. PATENT DOCUMENTS 5,825,849 A * 10/1998 Garland et al. .......... 379/22.01
5,835,565 A * 11/1998 Smith et al. ............. 379/27.04
6,038,300 A * 3/2000 Hartmann et al. .......... 379/177
2002/0146094 A1 * 10/2002 Brown ........................ 379/21

* cited by examiner

Primary Examiner—Duc Nguyen
(74) Attorney, Agent, or Firm—William N. Hogg

(57) ABSTRACT

A modem structure for connection to a line carrying both DSL signals and CTS signals, and a method of operation thereof, are provided. The modem structure includes a DSL modem connectable through a filter to remove the CTS frequencies on said line, and connected to network port. A diagnostic device is connected to the DSL modem to diagnose problems stored with the DSL modem. An analog modem is also provided that is connectable to said wire through a filter that filters out DSL signals on the line, and selectively connectable to said diagnostic device to read information in the diagnostic device and transmit the readings, In operation, the network port is continuously connected to DSL signals to operate network devices at high frequency, and said diagnostic device is selectively connected to the CTS device for diagnostic purposes using low frequency signals.

12 Claims, 1 Drawing Sheet

METHOD AND STRUCTURE FOR DIAGNOSING PROBLEMS ON A DSL DEVICE

FIELD OF THE INVENTION

The present invention relates generally to diagnosing and transmitting problems on DSL lines and connections and, more particularly, to diagnosing problems with DSL connections and transmitting the results in a manner to avoid problems associated with higher speed DSL signals.

BACKGROUND OF THE INVENTION

Although the invention has other uses, it is especially adapted to be used to diagnose problems encountered on DSL lines for operating computers or other network devices. It is common practice in today's technology to use a single conventional ground wire to transmit both higher frequency DSL signals (e.g. normally above about 4 kHz) and lower frequency Conventional Telephone Signals (CTS), sometimes referred to colloquially as Plain Old Telephone Service (POTS) (normally from about 30 Hz to less than about 4 kHz). Table I shows the conventional maximum usable length of copper lines that can accommodate DSL signals.

TABLE I

| Data Rate (DSL) | Wire Gauge | Distance (Max.) |
| --- | --- | --- |
| 1.5 or 2 Mbps | 24 AWG (0.5 mm) | 18,000 ft. (5.5 Km) |
| 1.5 or 2 Mbps | 26 AWG (0.4 mm) | 15,000 ft. (4.6 Km) |

It has been the experience that, as the length of the lines increases, the problems encountered with the DSL signals increase, especially near the limit of the length allowable for such DSL signals to travel. This causes a large number of calls to the customer service provider technicians, who then must rely on the ability of the customer to properly find and read the necessary diagnostic information on the DSL modem. This can lead to time delays and errors in diagnostic evaluation and correction of problems. It is noted, however, that CTS signals do not experience the same number of problems at the same length of line. Therefore, it is desirable to provide a diagnostic tool for problems associated with DSL line length that is not subject to the problems associated with the DSL frequency.

SUMMARY OF THE INVENTION

According to the present invention, a modem structure for connection to a line carrying both DSL signals and CTS signals, and a method of operation thereof, are provided. The modem structure includes a DSL modem connectable through a filter to remove the CTS frequencies in said line, and is connected to network port. A diagnostic device is connected to said DSL modem to diagnose problems stored with the DSL modem. An analog modem is also provided that is connectable to said wire through a filter that filters out DSL signals, and selectively connectable to said diagnostic device to read information in the diagnostic device and transmit the readings.

In operation, the network port is continuously connected to DSL signals to operate network devices at high frequency, and said diagnostic device is selectively connected to the CTS device for diagnostic purposes using low frequency signals.

DESCRIPTION OF THE PREFERRED EMBODIMENT(S)

Figure 1:
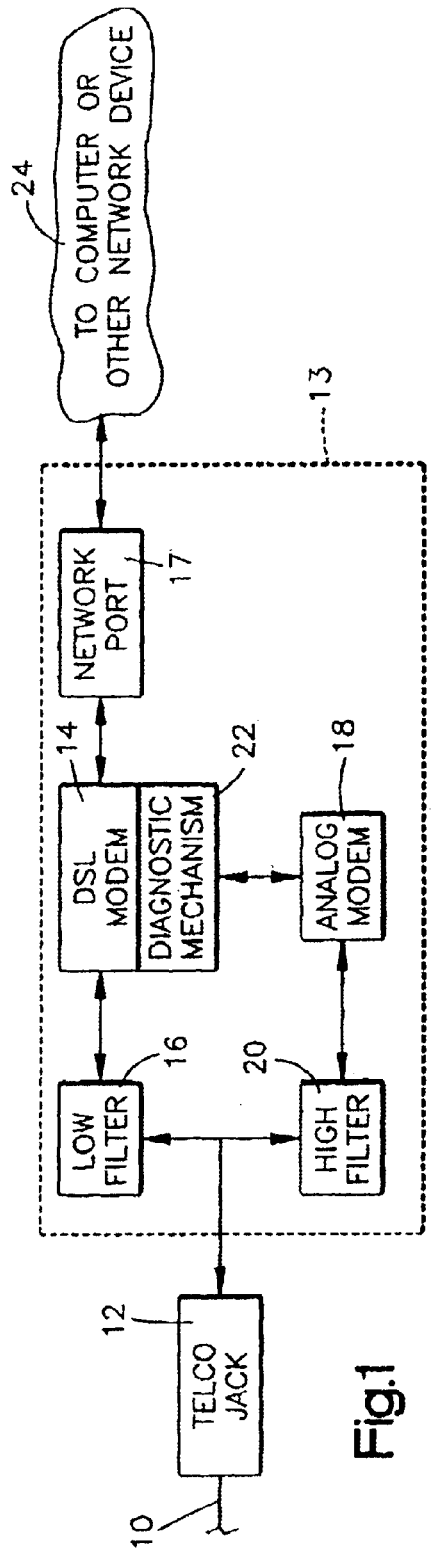
FIG. 1 is a graphical representation of a DSL line connection, through a modem structure to a wire to permit CTS diagnostics to be performed.

Referring now to the drawings, and for the present to FIG. 1, there is shown a representation of a structure for connecting to a phone line that has both higher frequency DSL signals and lower frequency CTS signals thereon, and which allows the DSL modem to be diagnosed for problems, and the results transmitted using lower frequency CTS signals. A conventional phone line wire 10 carries both lower frequency CTS signals (conventionally in the range of from about 30 Hz to 4 kHz) and higher frequency DSL signals (conventionally above 4 kHz). Thus, as is standard practice, the same line 10 can be used simultaneously for both DSL transmission/receiving and CTS transmission/receiving. (Although the lower frequency CTS signals are used for voice transmission/receiving, they can also be used to carry non-voice information such as commands and digital readouts.) As is conventional practice, the line 10 is connected to a telephone (TELCO) jack 12 which will serve as the DSL connection to the line 10. It should be noted that normally another jack (not shown), connected to the same line 10, would be used for CTS connection to the line 10.

A modem structure 13 is provided to carry the higher frequency DSL signals as well as use the lower frequency CTS signal for diagnostics of the DSL system. The modem structure 13 includes a DSL modem 14 connectable to the jack 12 through a low frequency filter. (As used herein, the term low frequency filter means that the filter filters out low frequency CTS signals, in this case, signals below about 4 kHz; and a high frequency filter means a filter that filters out DSL signals above about 4 kHz.) The DSL modem 14 is preferably one that operates on ANSI T1.413-1995 (a DSL standard). In this configuration, the DSL modem 14 is not switched "on" or "off", but rather allows the continuous transmission of higher frequency DSL signals to and from network port 17.

The modem structure 13 also includes an analog modem 18 connected to the jack 12 through high frequency filter 20. The analog modem 18 is preferably a Hayes Compatible modem. The output of the analog modem 18 is connected to a diagnostics mechanism 22 which is connected to the DSL modem 14 to perform diagnostics thereon. It should be noted that a DSL modem 14 conventionally provides read-outs of problems encountered on the DSL line and in the modem 14 that are readable from the network port 12.

The diagnostics mechanism preferably is a microprocessor programmed to read the diagnostics output from the DSL modem 14 and return the read-out values to the analog modem 18, which will pass these values through the jack 12 to the line 10. The analog modem 18 is normally turned "off" but can be turned "on" by a dial-up signal. Thus, in the absence of a dial-up signal, any lower frequency CTS signals on the wire 10 will not pass the analog modem 18 but, when turned on by a dial-up signal, the analog modem 18 allows any CTS signal to pass to the diagnostics mechanism 22 through the jack 12 carrying diagnostics queries, and return and CTS signal back to the jack 12 to carry the read-out diagnostics information to the line 10.

Thus, in operation, the modem structure 13 operates in the following manner. The line 10 may carry both lower frequency CTS signals and higher frequency DSL signals. The low frequency filter 16 filters out the CTS signals, and allows the higher frequency DSL signals to be transmitted to the network port 17. The DSL modem 14 does not provide any switching function, but rather allows all the higher frequency DSL signals through to the network port 17. Routers, or computers, or even an ethernet, can be attached to the network port 17, and the DSL signals will be delivered thereto. At the same time, if the analog modem 18 has not received a dial-up signal and, thus, there is no dial-up connection, the lower frequency CTS signals are not passed through the analog modem 18. However, if diagnostics are to be performed on the DSL modem 14, a dial-up connection signal is sent to the analog modem 18 on line 10 through the filter 20 to remove DSL signals. This lower frequency CTS signal will perform the required queries or diagnostics tests, and return a lower frequency CTS signal with the results through the jack 12 to the line 10. Hence, while any devices on the network are operating with higher frequency DSL signals, any diagnostics that need to be performed are done and reported on lower frequency, more reliable CTS signals.

Figure 2:
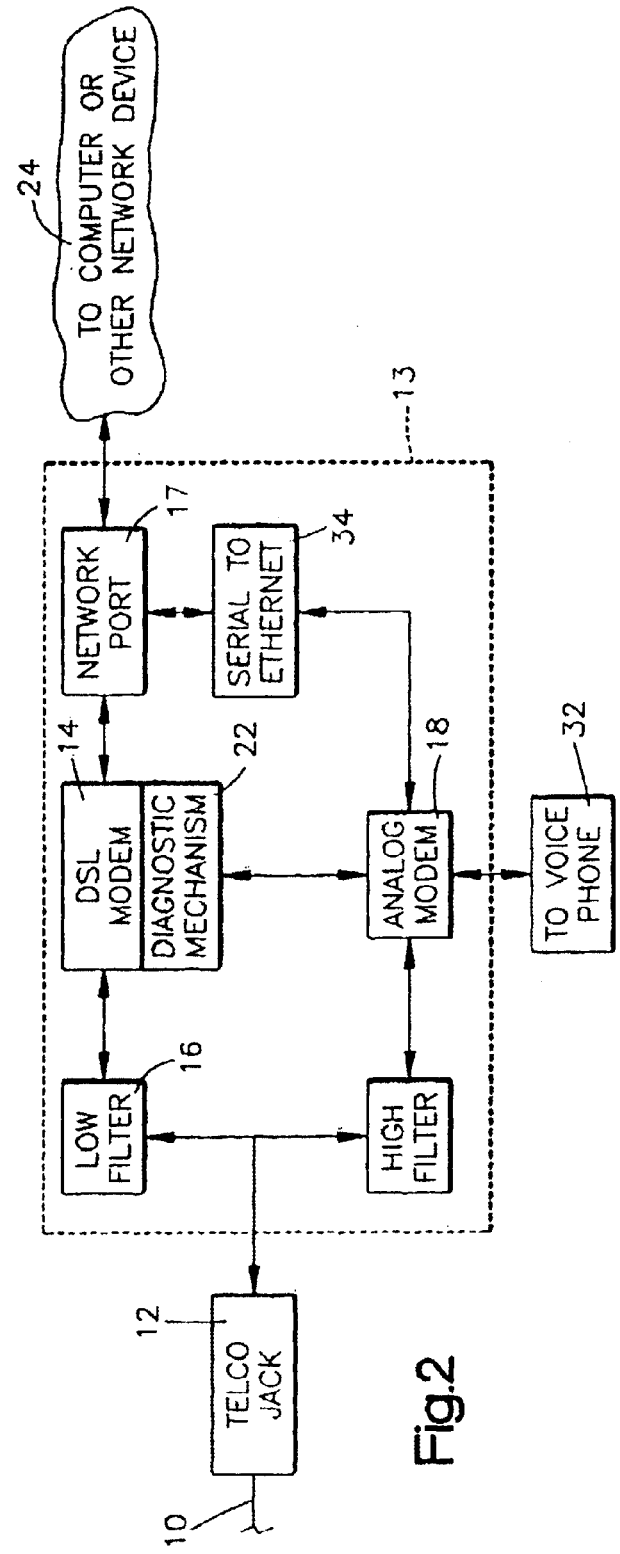
FIG. 2 is a view similar to FIG. 1 showing the same connection, but allowing the connection of a voice phone and/or serial port dial-up connection.

Referring now to FIG. 2, another embodiment of the invention is shown. In this embodiment, as in the embodiment of FIG. 1, a DSL line is provided to operate the computer through a DSL modem, and diagnostics are performed on the DSL modem through a CTS line through an analog modem. However, in this embodiment, a CTS line connection and the possibility of a dial-up connection for the computer through the analog modem are provided. In order to accomplish this, a connection from the analog modem to a voice phone 32 is provided. This will allow a normal CTS connection to send/receive the lower frequency CTS signals to and from the line 10 through jack 12. Also, the analog modem 18 is connected to a "serial to ethernet" port 34, which, in turn, is connected to the network port 17. This will allow a dial-up connection to be made for any device connected to the network port 17. Thus, if for any reason, a user desires to use a dial-up connection rather than a DSL connection for a device on the network port 17, this can be accomplished through the analog modem 18, and the lower frequency signals can be received/sent over line 10 through jack 12 in a conventional dial-up manner rather than DSL signals.

In this embodiment, the jack 12 can connect to the diagnostic mechanism 22 or to the serial to ethernet port 34, or to the diagnostic mechanism 22 and the diagnostics mechanism 22 can connect to the serial to ethernet port 34. However, the telephone 32 cannot connect to the diagnostics mechanism 22 or to the serial to ethernet port 17. These permitted and forbidden connections are handled by the analog modem 18.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A modem structure for connection to a line carrying both higher frequency signals and lower frequency signals, comprising;

a DSL modem connectable through a low frequency filter to said line, and connected to a network port, a diagnostic device connected to said DSL modem to diagnose problems stored in the DSL modem;

an analog modem connectable to said line through a high frequency filter and selectively connectable to said diagnostic device to read information in the diagnostic device and transmit the readings, whereby, the network port is continuously connected to high frequency signals to operate network devices at high frequency, and said diagnostic device is selectively connected to the analog device for diagnostic purposes using low frequency signals.

2. The invention as defined in claim 1 wherein the low frequency signals are CTS signals, and the high frequency signals are DSL signals.

3. The invention as defined in claim 2 wherein the low frequency signals are actuated by a dial-up connection to said analog modem.

4. The invention as defined in claim 1 wherein there is a telephone communication connection to said analog modem.

5. The invention as defined in claim 1 wherein a dial-up connection for a network device is provided through said analog modem.

6. The invention as defined in claim 1 wherein there is both a dial-up connection for a network device and a telephone communication connection to said analog modem.

7. A method of diagnosing trouble on a line carrying both high frequency and low frequency signals, wherein the high frequency signals are used to operate a network device comprising the steps of:

passing the high frequency signals through a DSL modem to a network port, selectively passing the low frequency signals through an analog modem to a diagnostics device connected to said DSL modem, whereby, the network port is continuously connected to high frequency signals to operate network device at high frequency, and said diagnostic device is selectively connected to the analog modem for diagnostic purposes using low frequency signals.

8. The invention as defined in claim 7 wherein the low frequency signals are CTS signals, and the high frequency signals are digital signals.

9. The invention as defined in claim 7 wherein the low frequency signals are actuated by a dial-up connection to said analog modem.

10. The invention as defined in claim 7 wherein there is a telephone communication connection to said analog modem.

11. The invention as defined in claim 7 wherein a dial-up connection for a network device is provided through said analog modem.

12. The invention as defined in claim 7 wherein there is both a dial-up connection for a network device and a telephone communication connection to said analog modem.

* * * * *